March 3, 1936. W. T. MOORE 2,032,376
GUN
Filed Dec. 26, 1933 4 Sheets-Sheet 1
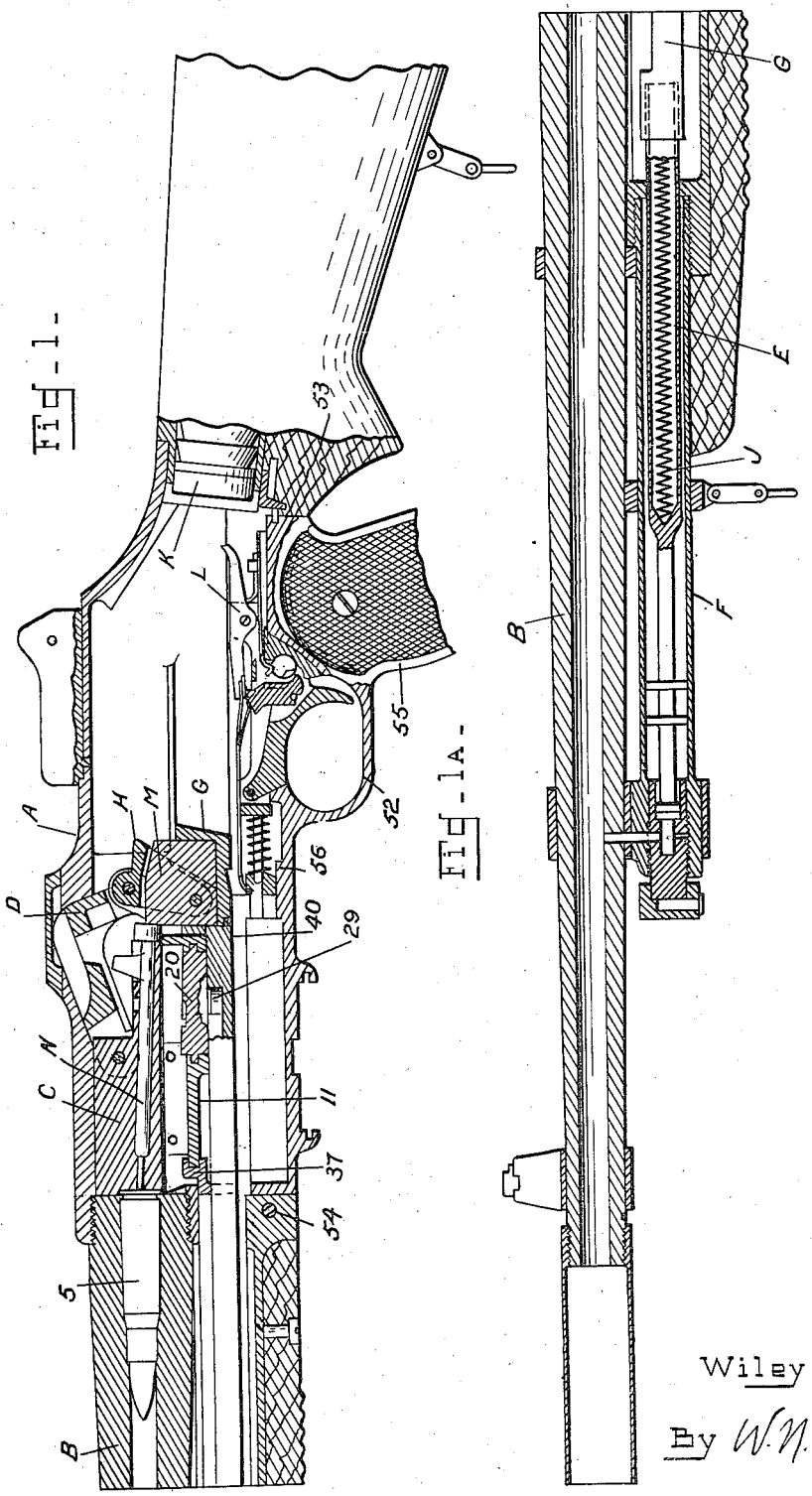
Inventor
Wiley T. Moore
By W. N. Roael
Attorney March 3, 1936.  W. T. MOORE  2,032,376
GUN
Filed Dec. 26, 1933   4 Sheets-Sheet 2
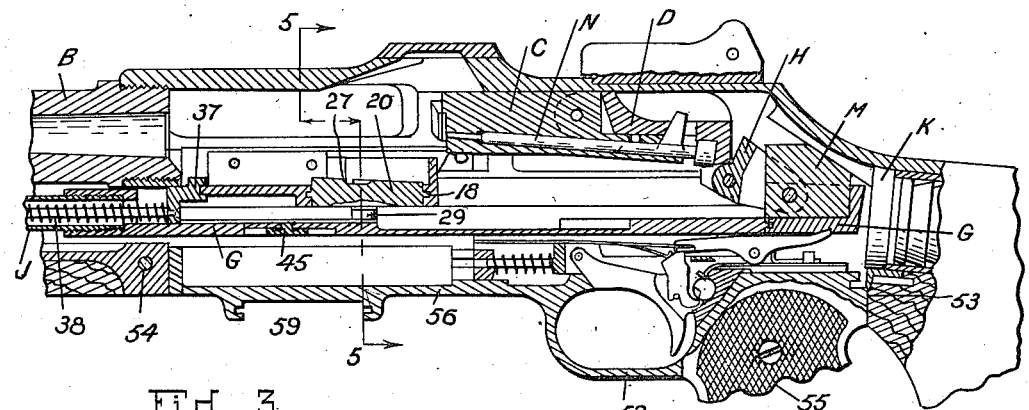
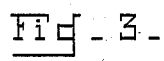
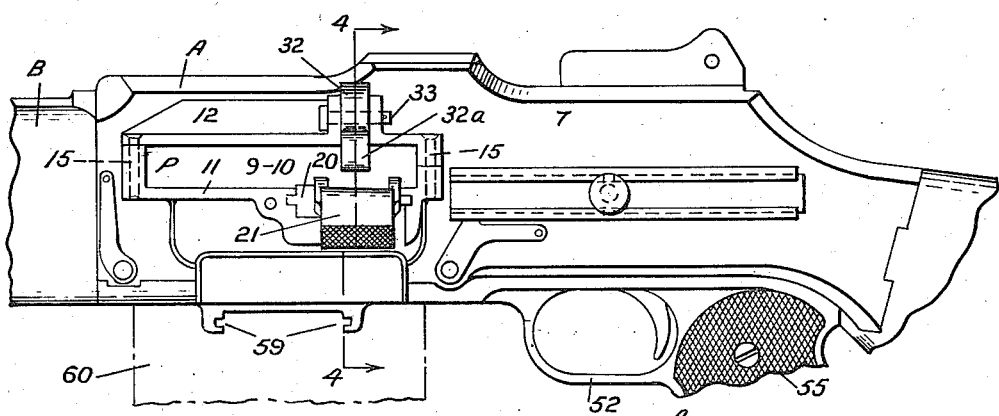
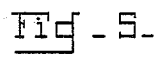
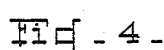
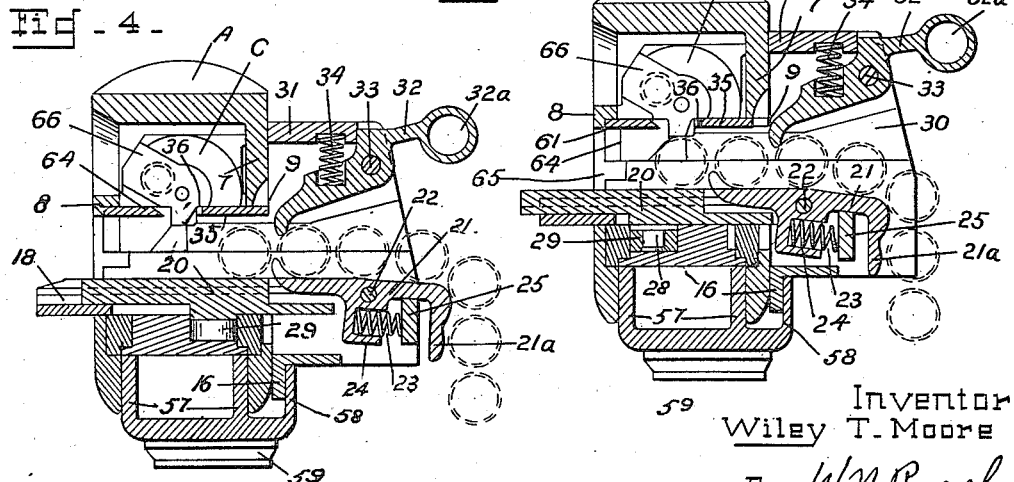
Inventor
Wiley T. Moore
By W. N. Roach
Attorney

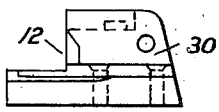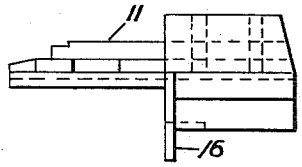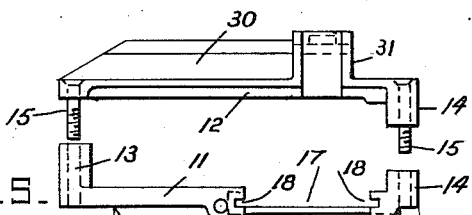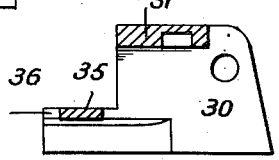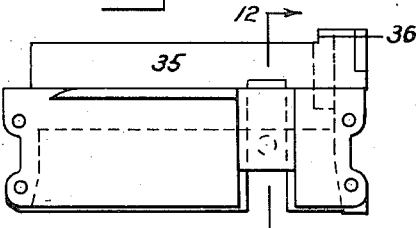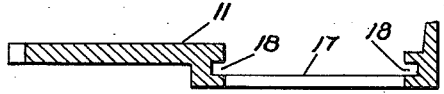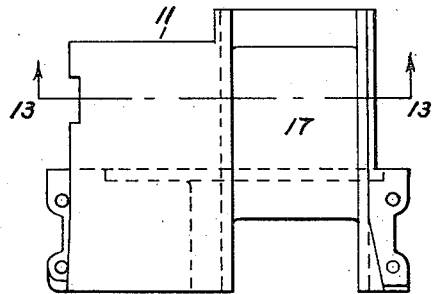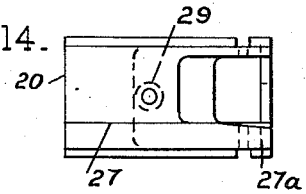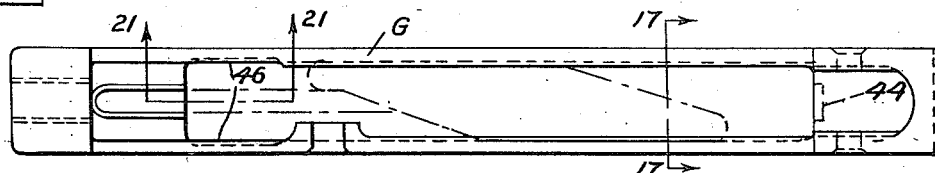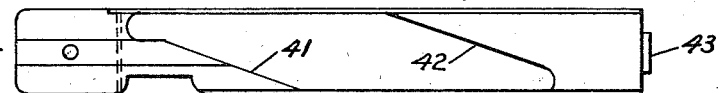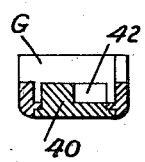

March 3, 1936.  W. T. MOORE  2,032,376
GUN
Filed Dec. 26, 1933  4 Sheets-Sheet 4
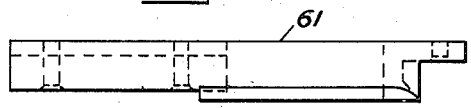
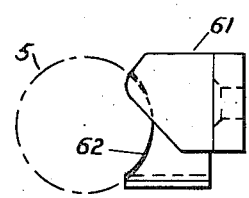
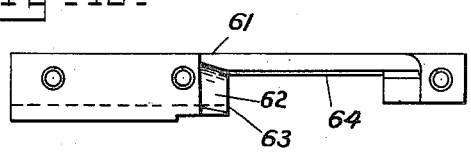
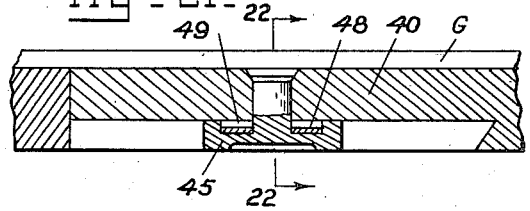
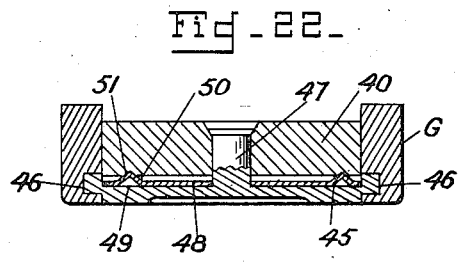
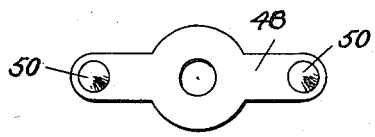
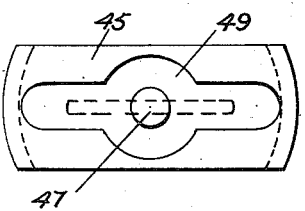
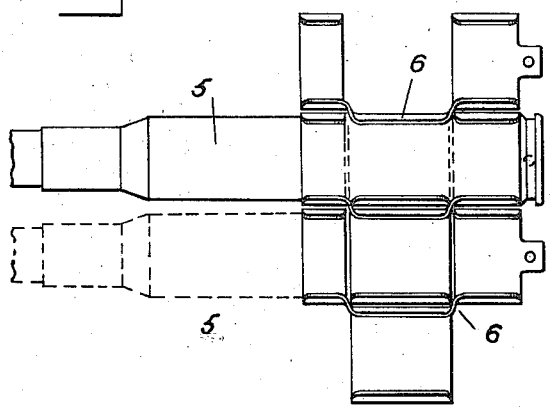
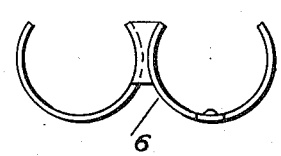
Inventor
Wiley T. Moore
By W. N. Roach
Attorney Patented Mar. 3, 1936

2,032,376

UNITED STATES PATENT OFFICE 2,032,376

GUN

Wiley T. Moore, United States Army,
Wright Field, Ohio

Application December 26, 1933, Serial No. 703,987

9 Claims. (Cl. 42—3)

(Granted under the act of March 3, 1883, as
amended April 30, 1928; 370 O. G. 757)

The invention described herein may be manufactured and used by or for the Government for governmental purposes without the payment to me of any royalty thereon.

This invention relates to a gun and is an improvement on the gun shown in Patent No. 1,293,022 of February 4, 1919.

The gun of the patent is the Browning automatic rifle and is a light machine gun adapted to be carried by infantry troops and fired without the aid of a separate support. The ammunition for the gun is supplied by means of a magazine holding twenty cartridges. When a magazine is empty it is removed from the gun and a loaded magazine inserted in its place. The rate of fire of the gun is approximately 500 shots per minute but the actual rate of fire is greatly reduced because much time is lost in replacing magazines and in reaiming. Further, in limiting the continuous firing to 20 rounds, the gunner just about gets on this target when it is time to reload. These frequent interruptions have the effect of disarming the gunner for considerable periods of time during which he is exposed to the deliberate aimed fire of the enemy. Under these conditions the gunner naturally develops a tendency to reopen fire before the gun is properly aimed or directed and as a result his efficiency is impaired and a large amount of ammunition is wasted.

The purpose of this invention is to modify the Browning automatic rifle so that ammunition may be supplied by a belt. Inasmuch as a large number of Browning rifles are in existence it is desirable to effect the conversion of the feeding mechanism by a minimum substitution of parts and without requiring extensive modification of the retained units or interfering with the standard characteristics of the gun.

The improvements are therefore directed to the incorporation in the gun of a belt-feeding mechanism which is directly associated with the breech-bolt operating slide.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawings, wherein:

Fig. 1—1a is a divided longitudinal sectional view of the gun with the parts in battery.

Fig. 2 is a similar view with the parts in position of full recoil.

Fig. 3 is a view in left side elevation of the gun.

Figs. 4 and 5 are sectional views on the corresponding lines of Figs. 3 and 2 through the feed box showing the feed slide at the opposite ends of its stroke.

Fig. 6 is a view in front elevation of the top plate of the feed box.

Fig. 7 is a view in front elevation of the bottom plate of the feed box.

Fig. 8 is a view in side elevation of the top plate of the feed box.

Fig. 9 is a view in side elevation of the bottom plate of the feed box.

Figs. 10 and 11 are plan views of Figs. 8 and 9.

Fig. 12 is a sectional view on the line 12—12 of Fig. 10.

Fig. 13 is a sectional view on the line 13—13 of Fig. 11.

Fig. 14 is a plan view of the feed slide.

Fig. 15 is a plan view of the slide.

Fig. 16 is a plan view of the cam plate for the slide.

Fig. 17 is a sectional view on the line 17—17 of Fig. 15.

Fig. 18 is a plan view of the right bolt support.

Fig. 19 is a view in side elevation of the bolt support.

Fig. 20 is a rear end view of Fig. 18.

Fig. 21 is a sectional view on the line 21—21 of Fig. 15.

Fig. 22 is a sectional view on the line 22—22 of Fig. 21.

Fig. 23 is a plan view of the latch spring.

Fig. 24 is a plan view of the latch.

Fig. 25 is a plan view of a portion of an ammunition belt.

Fig. 26 is a view in rear elevation of one of the belt links.

Referring to Figs. 1 and 2 the gun comprises a breech casing A, a barrel B secured to the casing, a breech bolt C mounted in the casing for reciprocal movement, and a breech bolt lock D engageable with the casing. A piston E, in a gas cylinder F that receives gas from the barrel, is connected to a slide G which is associated with the breech bolt by means of a link H which is pivoted to the bolt lock D. When the slide moves rearwardly the link H lowers the bolt lock D and then serves as a connector to retract the bolt C against the action of a drive spring J. The slide G is arrested by a buffer K and held in retracted position by a sear L. The slide includes a hammer M for striking the firing pin N as the slide arrives in battery. All of the foregoing elements are present in the Browning automatic rifle and have not been materially modified.

As noted in the patent, the cartridges are carried in a magazine and are fed vertically into a position to be moved into the chamber of the barrel by the breech bolt C. This method of feeding the cartridges is eliminated in the gun of this application.

Referring to Figs. 25 and 26 the cartridges 5 are carried in a belt of the metallic disintegrating link type, adjoining links 6 being connected by a cartridge and being disconnected when the cartridge, which constitutes a pivot pin, is withdrawn.

Referring to Figs. 4 and 5, the left side wall 7 and right side wall 8 of the breech casing are provided respectively with openings 9 and 10 for receiving a feed box P (Fig. 3) which is inserted through the opening 9. The feed box is conveniently formed of a bottom plate 11 (Fig. 9) and a top plate 12 (Fig. 8) held in spaced relation by a front wall 13 and rear wall 14 which form the sides of the mouth of the box and are positioned on the outer side of the breech casing. The front and rear walls are carried or formed on either or both the plates 11 and 12 and the assembly is maintained by welding or by screw-bolts 15, the latter being shown.

The bottom plate 11 is provided on its under side with a rib 16 adapted to engage the left side wall 7 of the breech casing (Fig. 4). The rear portion of the plate 11 is formed on its upper side with a transversely disposed channel 17 and with opposite grooves 18—18 for slidably receiving tongues 19 of a belt feed slide 20 (Fig. 14). The slide carries a belt feed pawl 21 which is mounted on a pivot pin 22. The head of the pawl is normally maintained above the plane of the slide by means of a coil spring 23 confined between a depending lug 24 on the pawl and a skirt 25 on the slide. The pawl 21 includes an externally accessible finger piece 21a.

The upper face 26 of the slide 20 (Fig. 2) is inclined upwardly towards the chamber of the gun barrel and is interrupted in its forward portion by a shoulder 27 adapted to hold the front edge of the link 6 as the cartridge is pushed forwardly. The left end 27a of the shoulder 27 is tapered for the purpose of guiding the links of the belt.

A pin 28 (Fig. 5) on the under side of the slide 20 carries a roller 29 for engaging the slide G as will hereinafter appear in detail.

The top plate 12 of the feed box is formed with a rib 30 (Fig. 8) adapted to engage the left side wall 7 of the breech casing. The rear portion of the top plate is formed with a bridge 31 (Fig. 5) under which is disposed a belt holding pawl 32. The pawl 32 is mounted on a pivot pin 33 and its head is normally maintained in the feed way by means of a coil spring 34 confined between the pawl and the crosspiece of the bridge. The pawl 32 includes an externally accessible finger piece 32a. The bridge also bears against the side plate 7 of the casing to give stability to the mounting of the feed box.

The inside portion 35 (Figs. 4 and 5) of the top plate which is disposed within the casing A forms a rail for supporting the breech bolt C. At the rear end of the rail is a laterally projecting shoulder 36 (Fig. 10) whose function is to eject the empty cartridge case from the bolt.

The front edge of the bottom plate 11 of the feed box forms a rigid support for the seat 37 of the driving spring J. The seat is secured on the rear end of the guide rod 38.

The slide G (Figs. 15 and 16) which is connected to the piston E is provided with a long opening 39 which serves in the patent to accommodate the cartridge magazine. In the gun of this application, a plate 40 having front and rear cam surfaces 41 and 42 at opposite ends and sides is placed as an insert in the opening 39.

The plate is held in place in the slide by means of a tongue 43 on its rear end which is engageable in a groove 44 in the slide and by means of a latch 45 (Fig. 2) on its front portion which is engageable in grooves 46—46 (Fig. 22) in opposite sides of the slide. The latch is positioned on the under side of the front end of the plate 40 and includes a pivot pin 47 inserted through the plate and held in place by having its free end upset. A flat spring 48 mounted on the pivot pin 47 and disposed in a recess 49 in the latch is provided with conical projections 50 engageable in correspondingly shaped recesses 51 in the plate 40 when the latch is engaged in the grooves 46 of the slide.

The cam surfaces 41 and 42 of the insert 40 and the side walls of the slide G cooperate to establish a cam path for the roller 29 of the belt feed slide 20 so that the slide 20 is reciprocated transversely of the gun when the slide G is reciprocated longitudinally thereof.

The trigger guard 52 (Fig. 2) retained by a tongue and groove connection 53 at its rear end and a pin 54 passing through the casing A, is provided with a hand grip 55 and with a forwardly extending bracket 56. The bracket includes a pair of ribs 57—57 (Fig. 5) engaging the inner sides of the walls 7 and 8 of the breech casing A, and a rib 58 for confining the rib 16 of the feed box. The under side of the bracket 56 is provided with transversely disposed spaced rails 59—59 for supporting an ammunition belt box 60 which is removably secured in any suitable manner.

A bolt support 61 (Figs. 18–20) forming a rail is secured to the right side plate 8 of the breech casing and is complementary to the left bolt support 35 formed as a rail on the top plate of the feed box. The bolt support 61 closes the front portion of the feedway and has a curved surface 62 serving as a stop for arresting the end cartridge of the belt in position to be engaged by the breech bolt C and pushed forwardly into the chamber of the gun barrel. The rear edge 63 of the stop 62 engages the link 6 and strips it from the cartridge. The stripped link passes out of the feedway through the opening 64 in the bolt support 61 and an aligned opening 65 in the right side wall 8 of the breech casing.

In loading the gun the bolt C is retracted and an end of the cartridge belt 5—6 is pushed into the feed box, overriding the belt feed pawl 21 and belt holding pawl 32, and is brought to rest when the first cartridge 5 engages the stop 62. The belt may be released for withdrawal by pressing together the finger pieces 21a and 32a of the pawls. The belt is guided in its passage through the feed box by engagement of the front edge of the links 6 with the link stripping shoulder 27 on the upper face 26 of the feed slide 20. This method of guiding during feeding is of considerable importance as the relation between bullet and cartridge case is not disturbed. The bolt C, upon moving forward pushes the cartridge into the chamber of the gun barrel, the link 6 being held by the shoulder 27 and stripped from the bullet.

After firing the cartridge, a portion of the gases of discharge enter the gas cylinder F and drive the piston E and slide G rearwardly, compressing the driving spring. The action of the slide G in unlocking and retracting the breech bolt C through the intermediation of the link H is the same as in the Browning patent.

During the final portion of the recoil stroke of the slide G, the bolt C having cleared the feedway, the front cam 41 acts directly on the roller 29 and moves the feed slide 20 from left to right. The belt feeding pawl 21 carried by the slide is engaged with the cartridge belt 5—6 and advances the belt through the feed box until the end cartridge is brought up against the stop 62.

During the final portion of the forward or counterrecoil stroke of the slide G the rear cam 42 moves the feed slide 20 from right to left, the belt being retained by the holding pawl 32.

Upon repeating the cycle of feeding the belt pushes the previously stripped link 6 from the feedway through the aligned openings 64—65.

The bolt C is provided with the customary extractor 66 for withdrawing the empty cartridge case from the chamber of the barrel. When the bolt is approaching the end of its recoil stroke the cartridge case strikes the ejector 35 on the top plate 12 of the feed box. This action causes the cartridge case to be pivoted with considerable force about the extractor and to be thrown through the ejection opening in the casing A.

I claim:

1. In a gun, a breech casing, a barrel supported thereby, a feed box mounted transversely in the casing directly in rear of the barrel, a cartridge advancing member carried by the feed box and movable transversely of the casing, a gas operated slide mounted for movement longitudinally of the casing below the feed box and directly reciprocating the cartridge advancing member, an axially movable breech block in the casing above the feed box, a coupling between the gas operated slide and breech bolt and means for moving the gas operated slide in counterrecoil.

2. In a gun, a breech casing, a barrel supported thereby, a feed box mounted transversely in the casing directly in rear of the barrel, a cartridge advancing member carried by the feed box and movable transversely of the casing, a gas operated slide mounted for movement longitudinally of the casing below the feed box and actuating the cartridge advancing member, an axially movable breech block in the casing above the feed box, a coupling between the gas operated slide and breech bolt and means for moving the gas operated slide in counterrecoil.

3. In a gun, a breech casing, a barrel supported thereby, a feed box mounted transversely in the casing and including a top plate, the portion of the top plate disposed within the casing forming a rail having a shoulder at its rear end for ejecting an empty cartridge case, a complementary rail carried by the breech casing, and a breech bolt slidably supported on the rails.

4. In a gun, a breech casing, a barrel supported thereby, a feed box mounted transversely in the casing and including a top plate, the portion of the top plate disposed within the casing forming a rail, a complementary rail carried by the breech casing, and a breech bolt slidably supported on the rails.

5. In a gun, a breech casing, a barrel supported thereby, a feed box having a channel extending transversely of the casing, and having an upper plate with a shoulder constituting means for ejecting an empty cartridge case, and a breech bolt riding on the upper plate of the feed box.

6. In a gun, a breech casing, a barrel supported thereby, a feed box carried by the casing; a slide, gas-operated in recoil, and movable on one side of the feed box; a driving spring for moving the slide in counterrecoil, and a seat for said spring rigidly supported on the feed box.

7. In a gun, a breech casing, a feed box mounted in the casing and including a bottom plate, a rib on the bottom plate engaging the exterior of the casing, a trigger guard secured to the casing and a rib on the trigger guard confining the rib on the feed box.

8. In a gun, a slide having side rails provided with a relatively long opening therebetween, a plate inserted in the opening and secured to the slide, cam surfaces on opposite ends of the plate cooperating with the side rails of the slide in establishing a cam path.

9. In a gun, a slide having an opening, a cam plate inserted in the opening of the slide, a latch, a pivot pin whereby the latch is rotatably carried by the cam plate for selective engagement with the slide, said latch provided with a recess, a flat spring mounted on the pivot pin and disposed in the recess of the latch and projections on the spring engageable with the slide.

WILEY T. MOORE.